United States Patent [19]

Huntsman et al.

[11] Patent Number: 4,556,014

[45] Date of Patent: Dec. 3, 1985

[54] TRESPASS DISCOURAGING DEVICE FOR PETS

[76] Inventors: Howard W. Huntsman; Stephen H. Huntsman, both of 94 E. 400 South, both of St. George, Utah 84770

[21] Appl. No.: 642,568

[22] Filed: Aug. 20, 1984

[51] Int. Cl.$^4$ ............................................. A01K 15/02
[52] U.S. Cl. .................................................... 119/29
[58] Field of Search ............... 119/29; 52/101; 272/74

[56] References Cited

U.S. PATENT DOCUMENTS

| | | | |
|---|---|---|---|
| 956,838 | 5/1910 | Treanor | 272/74 |
| 2,837,056 | 6/1958 | Kanta | 119/29 |
| 3,241,832 | 3/1966 | Miller | 272/74 |
| 3,589,718 | 6/1971 | Bessler | 272/74 |
| 3,589,719 | 6/1971 | Glass et al. | 272/74 |
| 3,599,606 | 8/1971 | Hayward | 119/29 X |

*Primary Examiner*—Hugh R. Chamblee
*Attorney, Agent, or Firm*—Workman, Nydegger & Jensen

[57] ABSTRACT

This device is designed to discourage pets from trespassing in neighbors yards, etc. Primarily, it consists of a plastic cylinder rotatable on a shaft placed in the ground. The cylinder includes a wire whip extending from its outer wall, for striking the pet when it licks bait on a bait stick extending from the device, and a spring on the inside of the cylinder is wound by a crank pin on the shaft, to set the device, which is harmless, and also produces the noise of a rattlesnake.

1 Claim, 2 Drawing Figures

TRESPASS DISCOURAGING DEVICE FOR PETS

This invention relates to training devices for pets, and more particularly, to a trespass discouraging device for pets.

The principal object of this invention is to provide a trespass discouraging device for pets, which will be employed to curb effectively the bad habit of dogs and cats using the neighbor's yards, lawns, flowers and plants, to take care of their daily needs.

Another object of this invention is to provide a trespass discouraging device for pets, which will be neither dangerous nor harmful if used as directed, and its design is such, that it is as easy to set as a common mouse trap, but it must be kept away from the face, and set as carefully as one would a mouse trap.

Another object of this invention is to provide a trespass discouraging device for pets, which will be of such design, as to employ a stick for holding bait, such as butter, bacon grease, tuna fish oil, or anything that pets will lick, realizing that their appetite comes first, and the design is also such, that it may be set to strike the pet a couple of slow easy strikes, or a number of fast hard strikes, as desired, when the animal licks the bait. The device also makes a noise like a rattlesnake, for that greater attention-gaining effect. Generally, one application is all that is needed for a pet to become discouraged, as has been proved by experiment.

A further object of this invention is to provide a trespass discouraging device for pets, which will also be employed by pet owners, who will benefit from its use by letting pets know that certain areas are off limits: it may also be placed by automobile wheels, garbage cans, etc.

Other objects are to provide a trespass discouraging device for pets, which is simple in design, inexpensive to manufacture, rugged in construction, easy to use and efficient in operation.

These, and other objects, will be readily evident, upon a study of the following specification, and the accompanying drawing, wherein.

Figure 1:
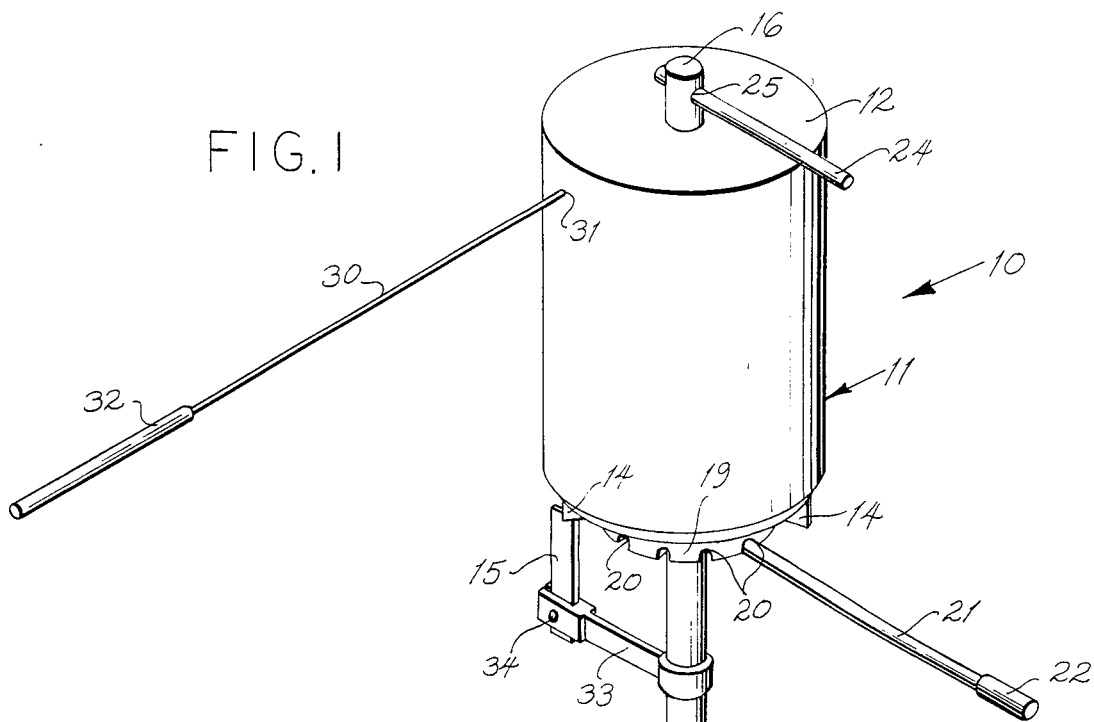
FIG. 1 is a perspective view of the present invention.
Figure 2:
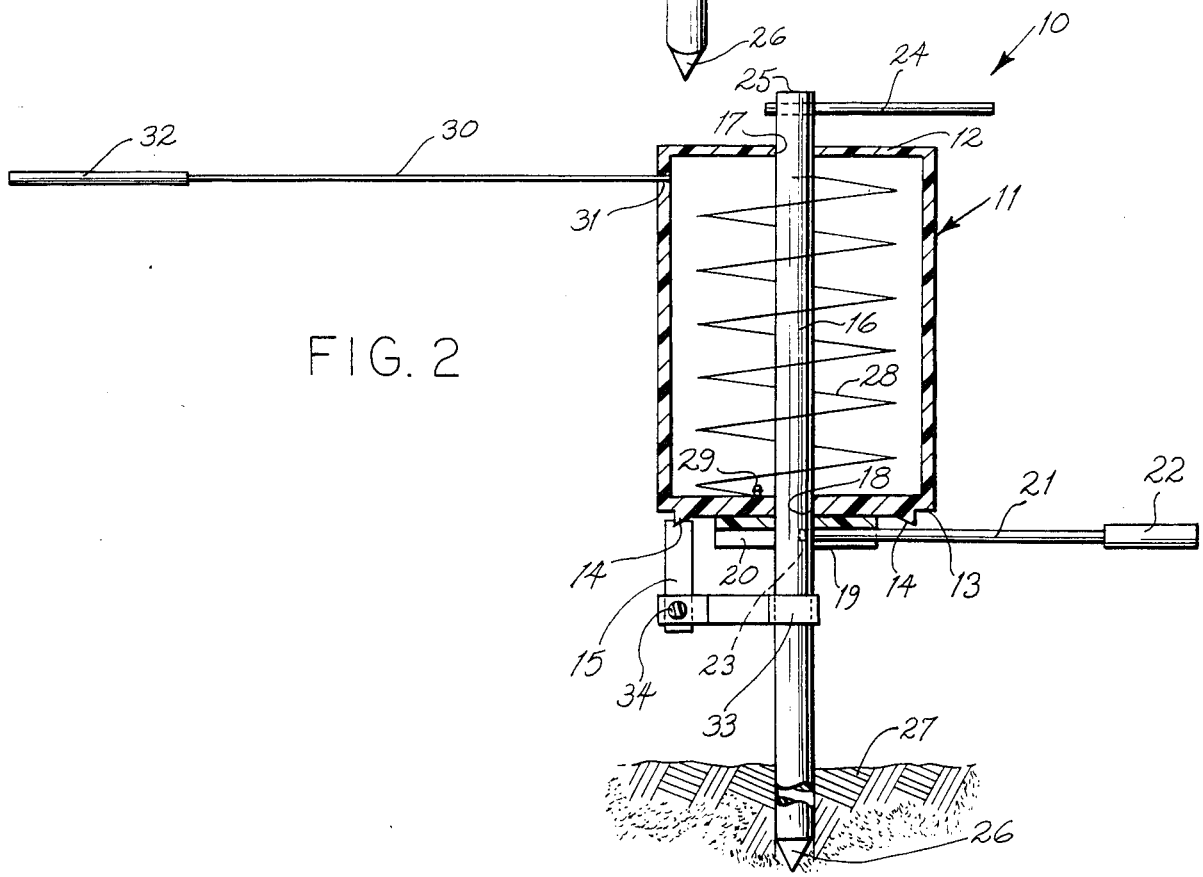
FIG. 2 is a vertical cross-sectional view of FIG. 1.

Accordingly, a device 10 is shown to include a cylindrical plastic housing 11, having a top end wall 12 and a bottom end wall 13, which are fixedly secured thereto, in a manner known in the art. End wall 13 includes an annular ring of steel ratchet teeth 14, which engage with a ratchet member 15, for a purpose which hereinafter will be described. A plastic pin or shaft 16 is freely and rotatably received within opening 17 of top end wall 12 and opening 18 of bottom end wall 13, and a plastic disc 19 is fixedly secured, in a suitable manner, to the bottom surface of end wall 13, and is provided with a plurality of equally and radially spaced openings or grooves 20, which serve as retaining and holding means for a bait stick 21, when device 10 is set for operation. Pin 21 serves to hold the bait 22, and is frictionally received at its opposite end within opening 23 in the outer periphery of shaft 16. Stick 21 locks in one of the grooves 20 when device 10 is set, and a winding or crank pin 24 is suitably fixedly secured, at one end, in a transverse opening 25 through the upper end of shaft 16. The opposite end of shaft 16 includes a point 26, for easy entry into the ground 27, and a coil spring 28 is received on shaft 16 within housing 11, and is suitably fastened, at one end, to the upper portion of shaft 16, and its opposite end is suitably secured to a pin 29, which is fixedly secured in the top of end wall 13 in a suitable manner. The spring 28 serves as an energy storage device when device 10 is wound, so as to release the whip member 30, which is fabricated of suitable spring wire, that is fixedly secured, in a suitable manner, at one end, in an opening 31 through the wall of housing 11 at its top portion.

A plastic shield 32 is suitably secured to the opposite end of whip 30, and serves the purpose of striking a pet when device 10 is triggered. One end of ratchet 15 engages with one of the ratchet teeth 14, and the opposite end of ratchet 15 is fixedly secured to the extending end of a bracket 33, by a suitable fastener 34, and the opposite end of bracket 33 is suitably fixedly secured to the outer periphery of shaft 16.

To use device 10, the housing 11 is held in the left hand, while turning it anti-clockwise, two or three revolutions, or more if needed. However, it should not be wound too tight, for it is possible to break the device. It is not delicate, but forcing it should be avoided.

After winding, the user holds the housing 11 and the crank pin 24 in the left hand, while placing the bait stick 21 in one of the grooves 20 and the opening 23 of shaft 16, and releasing it easily.

Device 10 is then held in the right hand, and shaft 16 is pushed into ground 27 about four inches, with the whip 30 pointing toward a flower or plant, but far enough away from a plant to make a circle with the whip 30, and it shall be noted that, before setting, the bait stick 21 should be dipped in butter, bacon grease, or whatever, for a pet to lick. When the pet licks the bait, it causes bait stick 21 to dislodge from its groove 20, and the wound spring 28 then rotates the housing 11, causing whip 30 to rotate and strike the pet's side. Simultaneously, as the above occurs, the ratchet 15, in engagement with teeth 14, produces the sound of a rattlesnake.

It shall be also noted, that when device 10 cannot be used in ground 27 soil, an opening may be drilled in a flat board, which will frictionally receive shaft 16, so as to support device 10.

While various changes may be made in the detail construction, it is understood that such changes will be within the spirit and scope of the present invention, as is defined by the appended claims.

I claim:

1. A trespass discouraging device for pets, comprising, in combination, a hollow cylindrical housing having a cylindrical side wall and opposite circular end walls, an opening through a center of each said end wall, a vertical post supported at its lower end by insertion in the ground, an upper end of said post being received through said openings for freely rotating said housing around said post, a tension coil spring around said post and within said housing, one end of said spring being affixed to said housing and an opposite end thereof being affixed to said post, a plurality of ratchet teeth on an underside of said housing being along a circular row concentrically around said post, a single upwardly oriented ratchet pawl engaging said ratchet teeth being affixed to said post, a rod for whipping an animal being secured to said housing and extending radially outwardly therefrom, a disc member mounted to the bottom end wall of said housing, said disc member having a plurality of grooves formed therein, and a bait stick mounted to said post, said bait stick being capable of engaging any one of the grooves formed within said disc member, whereby removal of said bait stick permits said cylindrical housing and rod to rotate under spring tension and produce a noise by said ratchet teeth striking said ratchet pawl.

* * * * *